United States Patent [19]

Reed et al.

[11] Patent Number: 4,800,118
[45] Date of Patent: Jan. 24, 1989

[54] COMPOSITIONS AND METHODS FOR IMPARTING STAIN RESISTANCE TO TEXTILE ARTICLES

[75] Inventors: John W. Reed; Richard D. Smith, both of Opelika, Ala.

[73] Assignee: West Point Pepperell, West Point, Ga.

[21] Appl. No.: 117,175

[22] Filed: Nov. 4, 1987

[51] Int. Cl.$^4$ .......................... C08G 8/14; C08G 8/28; D06M 15/41; D06P 1/56; D06P 5/12

[52] U.S. Cl. ...................................... 428/270; 8/455; 8/530; 8/560; 8/589; 8/917; 8/924; 8/925; 8/929; 8/930; 252/8.7; 427/300; 427/322; 427/323; 427/394; 428/272; 428/378; 428/395; 525/480; 528/150; 528/151; 528/153; 528/155; 568/28; 568/33; 568/34; 568/35

[58] Field of Search .................. 8/455, 530, 560, 589, 8/917, 924, 925, 929, 930; 252/8.7; 427/394; 428/270, 272; 525/480; 528/150, 151, 155; 568/28, 33, 34, 35

[56] References Cited

U.S. PATENT DOCUMENTS

| | | |
|---|---|---|
| 2,623,806 | 12/1952 | Fuchs et al. . |
| 2,822,346 | 2/1958 | Soule et al. ........................ 528/151 |
| 2,961,373 | 11/1960 | Boyer ................................ 525/480 |
| 3,038,882 | 6/1962 | Gavlin et al. ..................... 525/480 |
| 3,118,723 | 1/1964 | Harding . |
| 3,178,309 | 4/1965 | Harding . |
| 3,218,286 | 11/1965 | Fusco et al. ...................... 525/480 |
| 3,225,104 | 12/1965 | Harding et al. . |
| 3,322,477 | 5/1967 | Freeman . |
| 3,448,078 | 6/1969 | Higgenbottom .................. 528/151 |
| 3,485,797 | 12/1969 | Robins et al. ..................... 528/151 |
| 3,663,157 | 5/1972 | Gilgien et al. . |
| 3,687,603 | 8/1972 | Abel et al. ........................... 8/530 |
| 3,765,839 | 10/1973 | Mueller et al. . |
| 3,849,162 | 11/1974 | Mueller et al. . |
| 3,917,715 | 11/1975 | Leslie et al. . |
| 4,192,754 | 3/1980 | Marshall et al. .................... 252/8.8 |
| 4,287,366 | 9/1981 | Yamaguchi et al. .................. 568/33 |
| 4,291,177 | 9/1981 | Mark et al. ........................ 568/726 |
| 4,295,852 | 10/1981 | Walz et al. ........................... 8/560 |
| 4,302,202 | 11/1981 | Sumner et al. ....................... 8/560 |
| 4,317,736 | 3/1982 | Marshall .......................... 252/8.75 |
| 4,325,890 | 4/1982 | Reitz et al. . |
| 4,374,662 | 3/1983 | Konishi et al. ..................... 71/103 |
| 4,501,591 | 2/1985 | Vcci et al. ............................ 8/560 |
| 4,592,940 | 6/1986 | Blyth et al. .......................... 428/96 |

OTHER PUBLICATIONS

Allied Colloids Technical and Processing Data, TPD 3079, "ALCOFIX S, ALCOFIX S CONC POWDER".

Crown Zellerbach, Technical Bulletin, "4,4'-Sulfonyldiphenol", (May 1977).

Dimitur, S. et al., "Syntans from Dihydroxydiaryl Sulfones and p-Phenol Sulfonic Acids", CA Vol. 73 (1970), No. 36618d.

Baeder, J., "Carpet Stain Resist Update", paper presented at the Southeastern AATCC Winter Symposium, (Dec. 4-5, 1987).

Primary Examiner—James C. Cannon
Attorney, Agent, or Firm—Pennie & Edmonds

[57] ABSTRACT

A light stabile composition for imparting stain resistance to polyamide fiber-containing textile articles (e.g. nylon, wool or silk carpets) comprises a halogenated (e.g. brominated or chlorinated) aryl group-containing product of the condensation polymerization of a hydroxyaryl sulfonic acid (e.g., para-hydroxyphenyl sulfonic acid), a dihydroxydiaryl sulfone (e.g., dihydroxydiphenyl sulfone) and an aldehyde (e.g., formaldehyde). The polyamide fiber-containing textile articles are converted to a stain resistant product by containing the fibers with an acidified aqueous solution of the aforesaid composition.

50 Claims, No Drawings

COMPOSITIONS AND METHODS FOR IMPARTING STAIN RESISTANCE TO TEXTILE ARTICLES

BACKGROUND OF THE INVENTION

1. Technical Field

The present invention relates to light-stable compositions useful for rendering polyamide fiber-containing textile articles resistant to staining by acid dyes that are found, for example, in foods and beverages; processes for forming such compositions; polyamide fiber-containing textile articles whose fibers have been so rendered; and processes for imparting stain resistance to such textile articles.

As used herein, the word "polyamide" in "polyamide fiber" means fiber or sheet-formable polymers of organic bifunctional amino-, hydroxy-, carbonyl-, amino-hydroxy-, and carboxyl compounds and which contain linkages of the general formula:

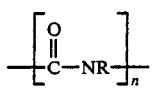

where R can be H, unbranched or branched, unsubstituted or substituted $C_1$-$C_{12}$ alkyl, cycloalkyl, alicyclic, aromatic or other groups, and n is an integer greater than one. Included among such polyamides are synthetic polyamides, e.g., nylons, and polypeptides such as constitute protein fibers, e.g., wool and silk. The term "fiber" includes fibers of continuous or indefinite length (i.e., filaments) and fibers of relatively short length (e.g., staple).

The term "stain resistance" as used herein with reference to textile articles means the ability to resist staining by Kool-Aid according to the Stain Resistance Test described below. The purpose of the test is to identify textile articles having durable and lasting resistance to staining normally caused by acid dyes such as are found in various foods and beverages.

The term "lightfastness" as used herein with reference to textile articles means the ability to resist yellowing when subjected to radiation from a xenon light source that approximates intense sunlight under the Lightfastness Test given below. The purpose of the test is to identify textile articles having improved light-fastness to yellowing normally caused by prolonged exposure to sunlight.

2. Description of Background Art

Compositions used in the textile field to impart resistance to staining, for example, by acid dyes found in foods and beverages, have important applications to textile articles including those made of polyamide fibers, e.g., nylon, wool and silk. Several formulations that have been sold and used for this purpose are available, such as Mesitol NBS from Mobay Chemical Company, Product FX 366M from 3M and Product 311A from E. I. du pont de Nemours and Company.

However, a common problem with these previously known products is their lack of stability towards light, particularly in the ultraviolet region of the spectrum. This characteristic causes textile articles treated with these products to turn yellow and become discolored upon prolonged exposure to sunlight. The discoloration is believed to be the result of the decomposition of the aromatic moieties of the composition where the methylene group is attached to the ring structure. The problem of such discoloration usually is compounded by the concomitant loss of stain resistance.

Accordingly, it is an object of the present invention to provide a light-stabile composition for providing polyamide (e.g., nylon, wool and silk) fiber-containing textile articles with improved resistance to staining by acid dyes found in food beverages and other products. The invention is also intended to provide processes for making the aforementioned light stabile compositions. Another object is to provide textile articles whose fibers have been rendered stain resistant by contacting the fibers with the aforementioned light stabile compositions. Yet another object is to provide processes for preparing the aforementioned stain resistant textile articles.

These and other objects of the invention, as well as a fuller understanding of the advantages thereof, can be had by reference to the following description and claims.

SUMMARY OF THE INVENTION

The foregoing objects are achieved according to the present invention by novel compositions for imparting stain resistance to polyamide fiber-containing textile articles, comprising a halogenated aryl group-containing product of the condensation polymerization of a hydroxyaryl sulfonic acid, a dihydroxydiaryl sulfone, and an aldehyde. The aryl group can be, for example, phenyl, naphthyl, and the like. The compositions of the present invention can be applied to textile fabrics such as nylon, wool or silk carpets, and to leathers.

In the aforesaid compositions, the halogenated condensation polymerization product preferably contains, on average, about 0.16 to 0.67 atomic equivalent of halogen per aryl group.

Especially preferred among the compositions of the invention are halogenated condensation polymerization products (Formula I) wherein the halogen, X, is bromine, the hydroxyaryl sulfonic acid is para-hydroxyphenyl sulfonic acid (p-phenol sulfonic acid) (Formula II), the dihydroxydiaryl sulfone is di-para-hydroxyphenyl sulfone (di-p-phenol sulfone) (Formula III) and the aldehyde is formaldehyde (Formula IV). The composition is desirably used in admixture with water at a pH of about 4 or less.

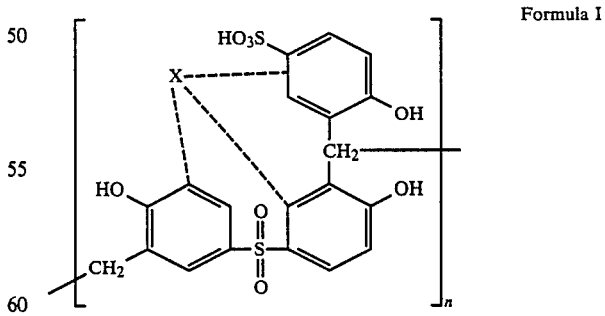

Formula I

Formula II

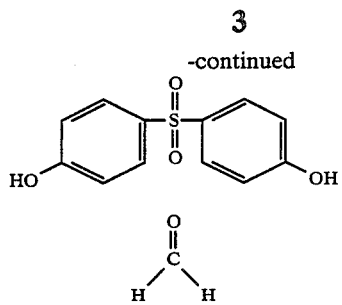

Formula III

Formula IV

While the mode of action of the compositions of the present invention is not entirely understood, and without wishing to be bound by theory, it is believed that modification of the aromatic rings of the condensation polymer by halogenation alters the polymer's UV absorbtivity which is shifted or reduced sufficiently to prevent or greatly reduce the susceptibility of the polymer molecule to photolylic breakdown by sunlight. This belief is supported by the observation that the compositions of the invention do not fluoresce in ultraviolet light. Further, since the compositions have halogen atoms bonded to the aromatic ring, they also have flame-retardant properties.

It has been discovered that the compositions of the invention can be prepared in several ways. One approach involves the halogenation of pre-formed condensation polymers of p-phenol sulfonic acid, di-p-phenol sulfone, and formaldehyde such as Mesitol NBS, product FX-366M, and Product 311A.

The preparation of the aforesaid condensation polymers is known in the art. For example, condensation of aldehyde, e.g., formaldehyde, with one or more phenols selected from diphenol sulfone, phenol sulfonic acid, and diphenol sulfone sulfonic acid can be performed in an acid or alkaline medium at elevated temperature. Each phenol is selected so that at about least 40% of it contains the

linkage and at least about 40% contains a sulfonic acid group. In an acid medium, from about 0.3 to about 0.5 mole of aldehyde is used for each mole of phenol and, in a basic medium, from about 0.9 to about 1.5 moles of aldehyde are used for each mole of phenol.

The halogen used is desirably bromine or chlorine. Bromine is easier to handle whereas chlorine is less expensive.

The molar ratio of halogen (e.g., $Br_2$) that is used to form the halogenated condensation polymer to the sulfonated monomer on a molar basis is preferably about 1:1, i.e., approximately 1 mole of halogen for each mole of sulfonated monomer that is used to form the polymer condensate. However, the ratio can be varied from about 0.5:1 to about 2:1. A molar ratio of less than about 0.5:1 noticeably reduces the stain-resistance effect. Increasing the halogen ratio above 2:1 further improves lightfastness to some extent, but a 1:1 ratio has been found to be adequate. However, since the molecular weight of the condensation polymer is not always known, it has been found that using from 18% to 56% bromine, and especially 38%, based on the weight of 100% active condensate, is preferred. The proper amount of halogen to be used for any given condensation polymer can be determined experimentally by one of ordinary skill in the art having the benefit of the present disclosure before him.

The halogenation is advantageously carried out in an inert solvent, such as methanol, isopropyl alcohol, 1,1,1-trichloroethane or diethylene glycol, or mixtures thereof. When water is used as a solvent, care must be taken to prevent localized high concentrations of halogen during halogenation. Excessive acid concentrations resulting from halogen acid liberated during halogenation can cause unwanted precipitation of the condensate. One method of overcoming this problem is to predissolve the halogen in solvent (e.g., methanol) and then add this premix to an aqueous solution of the condensate.

In practicing the process of the present invention, the reactants can simply be mixed as in ordinary halogenation reactions. For example, in the case of bromination, the bromine and methanol can be mixed together, and this pre-mix is then added to the condensation polymer with stirring. The halogenation proceeds rapidly, producing a moderate exotherm. The reaction usually exotherms to a temperature of about 55° C. after which the mixture can be heated to about 80° C. At the end of the reaction, aqueous sodium hydroxide (e.g., 25% by weight) can be added to neutralize the hydrogen halide formed during the reaction.

Another method of producing the compositions of the invention involves the halogenation of the hydroxyaryl sulfonic acid and/or the dihydroxydiaryl sulfone, separately or in combination, followed by condensation polymerization of the halogenated aryl-group containing product(s) with an aldehyde (e.g., formaldehyde or acetaldehyde) or with hydroxyaryl sulfonic acid or dihydroxydiaryl sulfone, as the case may be, and an aldehyde. The halogenation and condensation polymerization are carried out by the same processes as described above for the condensation polymerization and subsequent halogenation.

The halogenated aryl-group containing condensation polymers prepared by any of the foregoing synthetic routes may have a dark yellow or brown color. When the composition is diluted for application to the textile article to be treated, this yellow color usually has no adverse effect, particularly with darkly colored textiles. However, if it is desired to reduce the intensity of the yellow color, the product can be mixed with aqueous hydrogen peroxide (30%) and heated.

Textile articles whose fibers have been rendered stain resistant according to the present invention are prepared by contacting the fibers with a light stabile composition of the invention comprising, as previously indicated, a halogenated aryl group-containing product of the condensation polymerization of a hydroxyaryl sulfonic acid, a dihydroxydiaryl sulfone, and an aldehyde. Textile articles which can be treated in accordance with the invention include those containing acid-dyeable amide groups, particularly synthetic polyamides (nylon), wool and silk. The level of application of the present compositions required to achieve stain resistance varies with the dyeability of the fiber to be treated.

Carpets of major commercial importance are those having pile fibers of nylon, e.g. nylon 66 which is spun from polyhexamethylene adipamide, and nylon 6, a polycaprolactam fiber.

In accordance with the present invention, the compositions obtained by the processes described above are diluted with water and the pH of the solution is adjusted to between 2 and about 4. Such pH adjustment can be achieved using any water-soluble acid, e.g., mineral acids or carboxylic acids. The concentration of the aqueous composition and the amount used are such that it contains approximately 0.1 to 2% by weight (based on the total weight of the carpet) of the aforementioned halogenated condensation polymerization product.

The composition can be applied to textile articles before, after or concurrently with any dyeing step. A low pH solution for application of the halogenated condensate is more effective as the amide (e.g., —NHR) groups present in the fiber are more actively ionized at low pH. On the other hand, too low a pH unduly accelerates the absorption of the composition onto the fiber, resulting in uneven destribution.

The halogenated condensate can be applied continuously (pad or spray) or in dyebeck bath (exhaust). A particularly preferred method is to dye the fabric and heat it in a steamer to fix the dye. Then the halogenated condensate is water is sprayed onto the carpet while it is still hot, at a pH of 1.5–2.0.

DESCRIPTION OF PREFERRED EMBODIMENTS

The following nonlimiting examples are intended to illustrate the compositions, processes and products of the invention and the advantages thereof.

The "Stain Resistance Test" referred to in the following examples involves pouring pre-sweetened cherry Kool-Aid onto the textile article and leaving it on for eight hours. The textile article is then rinsed with tap water. If the textile article is not visibly stained by the Kool-Aid under the test conditions, the textile article is considered stain resistant within the meaning of the term as used herein.

The "Lightfastness Test" referred to in the following examples involves masking an area of the textile article with black tape, then exposing both the masked and unmasked areas of the textile article in an Atlas Weatherometer for 40 hours. The Weatherometer is a large chamber with a xenon light source that approximates intense sunlight. Afterward, if the exposed areas on the textile article are visibly the same color as the masked areas, then the textile article is said to have improved "lightfastness" within the meaning of the term as used herein.

EXAMPLE 1

A quantity (40 grams) of the condensation product of p-phenol sulfonic acid, dihydroxydiphenyl sulfone, and formaldehyde is dissolved in 110 grams of methanol. Bromine (15 grams) is slowly added with agitation, and the temperature of the resulting exotherm is allowed to rise to 50° C. The product is then neutralized with aqueous sodium hydroxide (25% by weight). The product contains approximately 22% of the initial condensate.

EXAMPLE 2

A quantity (40 grams) of the condensation product of p-phenol sulfonic acid, dihydroxy diphenyl sulfone, and formaldehyde is dissolved in 60 grams of water. A solution of bromine (15 grams) in 50 grams of methanol is added with agitation. The product is allowed to exotherm freely, then neutralized with aqueous sodium hydroxide (25% by weight). The product contains approximately 22% of the initial condensate.

EXAMPLE 3

A quantity (40 grams) of the condensation product of p-phenol sulfonic acid, dihydroxy diphenyl sulfone, and formaldehyde is dissolved in 60 grams of water. A solution of bromine (15 grams) in 50 grams of methanol is added with agitation. The product is allowed to exotherm freely, then neutralized with aqueous sodium hydroxide (25% by weight). A quantity (20 grams) of 30% hydrogen peroxide is added and the reaction mixture is heated to 80°–90° C. and kept at the temperature until the product becomes lighter in color, then cooled. The final product contains approximately 22% of initial condensate.

EXAMPLE 4

A quantity (100 grams) of commercially available 3M stain protection chemical FX366M is brominated by adding a solution of 15 grams of bromine in 50 grams of methanol. The product is then neutralized with aqueous sodium hydroxide (25% by weight).

EXAMPLE 5

A quantity (100 grams) of commercially available Dupont stain protection chemical 311-A is brominated by adding a solution of I5 grams of bromine in 50 grams of methanol. The product is then neutralized with aqueous sodium hydroxide (25% by weight).

EXAMPLE 6

A quantity (40 grams) of commercially available Mobay stain protection concentrated powder Mesitol NBS is dissolved in 110 grams of methanol. Bromine (15 grams) is slowly added With aqitaton. The product is then neutralized with aqueous sodium hydroxide (25% by weight).

EXAMPLE 7

A quantity (4.1 grams) of the product described in Example 1 is dissolved in 1000 grams of water and the pH of the solution is adjusted to 2.0 with sulfamic acid. A 60-gram piece of undyed Type 6 nylon carpet is placed in the solution, which is then heated to 160° F. for 20 minutes, rinsed, and extracted in a washing machine spin cycle. The carpet is then dried in a forced air oven for 20 minutes and removed. A Kool Aid stain test shows satisfactory stain resistance, and a sample of the carpet exposed to simulated sunlight for 40 hours in an Atlas Weatherometer with a xenon arc light source shows essentially no discoloration.

EXAMPLE 8

A quantity (4.2 grams) of the product described in Example 3 is dissolved in 1000 grams of water containing 1 gram of magnesium sulfate and 1 gram of Wetting and leveling agents. The pH of the solution is adjusted to 4.0 with acetic acid. A 60-gram piece of undyed Type 6 nylon carpet is placed in the solution, which is then heated to 160° F. for 20 minutes, rinsed, and extracted in a washing machine spin cycle. The carpet is then dried in a forced air oven for 20 minutes and removed. A Kool Aid stain test shows satisfactory stain resistance, and a sample of the carpet exposed to simulated sunlight for 40 hours in an Atlas Weatherometer with a xenon arc light source shows essentially no discoloration.

EXAMPLE 9

A quantity (5.5 grams) of the product described in Example 4 is dissolved in 1000 grams of water containing 1 gram of magnesium sulfate and 1 gram of wetting and leveling agents. The pH of the solution is adjusted to 4.0 with acetic acid. A 60-gram piece of undyed Type 6 nylon carpet is placed in the solution, which is then heated to 160° F. for 20 minutes, rinsed, and extracted in a washing machine spin cycle. The carpet is then dried in a forced air oven for 20 minutes and removed. A Kool Aid stain test shows satisfactory stain resistance, and a sample of the carpet exposed to simulated sunlight for 40 hours in an Atlas Weatherometer with a xenon arc light source shows essentially no discoloration.

EXAMPLE 10

A quantity (5.5 grams) of the product described in Example 5 is dissolved in 1000 grams of water containing 1 gram of magnesium sulfate and 1 gram of wetting and leveling agents. The pH of the solution is adjusted to 4.0 with acetic acid. A 60-gram piece of undyed Type 6 nylon carpet is placed in the solution, which is then heated to 160° F. for 20 minutes, rinsed, and extracted in a washing machine spin cycle. The carpet is then dried in a forced air oven for 20 minutes and removed. A Kool Aid stain test shows satisfactory stain resistance, and a sample of the carpet exposed to simulated sunlight for 40 hours in an Atlas Weatherometer with a xenon arc light source shows essentially no discoloration.

EXAMPLE 11

A quantity (4.1 grams) of the product described in Example 6 is dissolved in 1000 grams of water containing 1 gram of magnesium sulfate and 1 gram of wetting and leveling agents. The pH of the solution is adjusted to 4.0 with acetic acid. A 60-gram piece of undyed Type 6 nylon carpet is placed in this solution, which is then heated to 160° F. for 20 minutes, rinsed, and extracted in a washing machine spin cycle. The carpet is then dried in a forced air oven for 20 minutes and removed. A Kool Aid stain test shows satisfactory stain resistance, and a sample of the carpet exposed to simulated sunlight for 40 hours in an Atlas Wetherometer with xenon arc light source shows essentially no discoloration.

EXAMPLE 12

A quantity (0.92 gram) of the condensation product of p-phenol sulfonic acid, dihydroxydiphenylsulfone, and formaldehyde is dissolved in 1000 grams of water containing 1 gram of magnesium sulfate and 1 gram of wetting and leveling agents. The pH of the solution is adjusted to 4.0 with acetic acid. A 60-gram piece of undyed Type 6 nylon carpet is placed in this solution, which is then heated to 160° F. for 20 minutes, rinsed and extracted in a washing machine spin cycle. The carpet is then dried in a forced air oven for 20 minutes, and removed. A Kool Aid stain test shows satisfactory stain resistance. However, a sample of the carpet exposed to simulated sunlight for 40 hours in an Atlas Weatherometer with a xenon arc light source shows severe yellowing.

EXAMPLE 13

A quantity (3 grams) of commercially available Dupont stain protection chemical 311-A is dissolved in 1000 grams of water containing 1 gram of magnesium sulfate and 1 gram of wetting and leveling agents. The pH of the solution is adjusted to 4.0 with acetic acid. A 60-gram piece of undyed undyed Type 6 nylon carpet is placed in this solution, which is then heated to 160° F. for 20 minutes, rinsed and extracted in a washing machine spin cycle. The carpet is then dried in a forced air oven for 20 minutes, and removed. A Kool Aid stain test shows satisfactory stain resistance. However, a sample of the carpet exposed for 40 hours in an Atlas Weatherometer with a xenon arc light source shows severe yellowing.

EXAMPLE 14

A quantity (3 grams) of commercially available 3M stain protection chemical FX366M is dissolved in 1000 grams of water containing 1 gram of magnesium sulfate and 1 gram of wetting and leveling agents. The pH of the solution is adjusted to 4.0 with acetic acid. A 60-gram piece of undyed Type 6 nylon carpet is placed in this solution, which is then heated to 160° F. for 20 minutes, rinsed, and extracted in a washing machine spin cycle. The carpet is then dried in a forced air oven for 20 minutes, and removed. A Kool Aid stain test shows satisfactory stain resistance. However, a sample of the carpet exposed for 40 hours in an Atlas Weatherometer wth a xenon arc light source shows severe yellowing.

EXAMPLE 15

A quantity (0.9 gram) of commercially available Mobey stain protection concentrated powder Mesitol NBS is dissolved in 1000 grams of water containing 1 gram of magnesium sulfate and 1 gram of wetting and leveling agents. 1he pH is adjusted to 4.0 with acetic acid. A 60-gram piece of undyed Type 6 nylon carpet is placed in this solution, which is then heated to 160° F. for 20 minutes, rinsed, and extracted in a washing machine spin cycle. The carpet is then dried in a forced air oven for 20 minutes, and removed. A Kool Aid stain test shows satisfactory stain resistance, and a sample of the carpet exposed to simulated sunlight for 40 hours in an Atlas Weatherometer with xenon arc light source shows severe yellowing.

The foregoing examples are intended to illustrate, without limitation, the light stabile compositions of the present invention, their preparation, and use thereof for imparting stain resistance to polyamide fiber-containing textile articles. It is understood that changes and variations can be made therein without departing from the scope of the invention as defined in the following claims.

We claim:

1. A light stabile composition for imparting stain resistance to polyamide fiber-containing textile articles, comprising a halogenated aryl group-containing product of the condensation polymerization of a hydroxyaryl sulfonic acid, a dihydroxydiaryl sulfone, and an aldehyde.

2. A composition according to claim 1 wherein the halogenated condensation polymerization product contains an average of about 0.16 to about 0.67 atomic equivalent of halogen per aryl group.

3. A composition according to claim 1 wherein the halogen is bromine.

4. A composition according to claim 1 wherein the hydroxyaryl sulfonic acid is para-hydroxyphenyl sulfonic acid, the dihydroxydiaryl sulfone is dihydroxydiphenyl sulfone, and the aldehyde is formaldehyde.

5. A composition according to claim 1 wherein:

the halogenated condensation polymerization product contains an average of about 0.16 to about 0.67 atomic equivalent of halogen per aryl group;
the halogen is bromine; and
the hydroxyaryl sulfonic acid is para-hydroxyphenyl sulfonic acid, the dihydroxydiaryl sulfone is dihydroxydiphenyl sulfone, and the aldehyde is formaldehyde.

6. A composition according to claim 5 wherein the composition is in admixture with water at a pH of about 4 or less.

7. A process of forming a light stabile composition for imparting stain resistance to polyamide fiber-containing articles, comprising halogenating an aryl group-containing product of the condensation polymerization of a hydroxyaryl sulfonic acid, a dihydroxydiaryl sulfone, and an aldehyde.

8. A process according to claim 7 wherein the condensation polymerization product is halogenated with an average of about 0.16 to about 0.67 atomic equivalent of halogen per aryl group.

9. A process according to claim 7 wherein the condensation polymerization product is halogenated with bromine.

10. A process according to claim 7 wherein the hydroxyaryl sulfonic acid is para-hydroxyphenyl sulfonic acid, the dihydroxydiaryl sulfone is dihydroxydiphenyl sulfone, and the aldehyde is formaldehyde.

11. A process according to claim 7 wherein the halogenation is conducted in a reaction mixture formed by contacting an aqueous solution of the aryl group-containing condensation polymerization product with a solution of halogen in a hydroxylic organic solvent, and then neutralizing the resulting halogenated condensation product.

12. A process according to claim 7 wherein:
the condensations polymerization product is halogenated with an average of about 0.16 to about 0.67 atomic equivalent of halogen per aryl group;
the halogen is bromine;
the hydroxyaryl sulfonic acid is para-hydroxyphenyl sulfonic acid, the dihydroxy diaryl sulfone is dihydroxydiphenyl sulfone and the aldehyde is formaldehyde; and
the halogenation is conducted by contacting an aqueous solution of the aryl group-containing condensation polymerization product with a solution of halogen in methanol, and then neutralizing with alkali the reaction mixture containing the resulting halogenated condensation product.

13. A process according to claim 12 wherein the neutralized reaction mixture is mixed with water and the pH thereof adjusted to about 4 or less with a water-soluble acid.

14. A process according to claim 13 wherein the pH-adjusted aqueous reaction mixture is contacted with hydrogen peroxide to reduce the color of the mixture.

15. A process of forming a light stabile composition for imparting stain resistance to polyamide fiber-containing articles, comprising halogenating a hydroxyaryl sulfonic acid and polymerizing the halogenated hydroxyaryl sulfonic acid with a dihydroxydiaryl sulfone and an aldehyde.

16. A process according to claim 15 wherein the hydroxyaryl sulfonic acid is halogenated with an average of about 0.16 to about 0.67 atomic equivalent of halogen per aryl group.

17. A process according to claim 15 wherein the hydroxyaryl sulfonic acid is halogenated with bromine.

18. A process according to claim 15 wherein the hydroxyaryl sulfonic acid is para-hydroxyphenyl sulfonic acid, the dihydroxydiaryl sulfone is dihydroxydiphenyl sulfone, and the aldehyde is formaldehyde.

19. A process according to claim 15 wherein the halogenation is conducted in a reaction mixture formed by contacting an aqueous solution of the hydroxyaryl sulfonic acid with a solution of halogen in a hydroxylic organic solvent, and then neutralizing the resulting halogenated aryl group-containing product.

20. A process according to claim 15 wherein:
the hydroxyaryl sulfonic acid is halogenated with an average of about 0.16 to about 0.67 atomic equivalent of halogen per aryl group;
the halogen is bromine;
the hydroxyaryl sulfonic acid is para-hydroxyphenyl sulfonic acid, the dihydroxydiaryl sulfone is dihydroxydiphenyl sulfone and the aldehyde is formaldehyde; and
the halogenation is conducted by contacting an aqueous solution of the hydroxyaryl sulfonic acid with a solution of halogen in methanol, and then neutralizing with alkali the reaction mixture containing the resulting halogenated aryl group-containing product.

21. A process according to claim 20 wherein the neutralized reaction mixture is mixed with water and the pH thereof adjusted to about 4 or less with a water-soluble acid.

22. A process according to claim 21 wherein the pH-adjusted aqueous reaction mixture is contacted with hydrogen peroxide to reduce the color of the mixture.

23. A process of forming a light stabile composition for imparting stain resistance to polyamide fiber-containing articles, comprising halogenating a dihydroxydiaryl sulfone and polymerizing the halogenated dihydroxydiaryl sulfone with a hydroxyaryl sulfonic acid and an aldehyde.

24. A process according to claim 23 wherein the dihydroxydiaryl sulfone is halogenated with an average of about 0.16 to about 0.67 atomic equivalent of halogen per aryl group.

25. A process according to claim 23 wherein the dihydroxydiaryl sulfone is halogenated with bromine.

26. A process according to claim 23 wherein the hydroxyaryl sulfonic acid is para-hydroxyphenyl sulfonic acid, the dihydroxydiaryl sulfone is dihydroxydiphenyl sulfone, and the aldehyde is formaldehyde.

27. A process according to claim 23 wherein the halogenation is conducted in a reaction mixture formed by contacting a dihydroxydiaryl sulfone with a solution of halogen in a hydroxylic organic solvent, and then neutralizing the resulting halogenated aryl-group containing product.

28. A process according to claim 23 wherein:
the dihydroxyldiaryl sulfone is halogenated with an average of about 0.16 to about 0.67 atomic equivalent of halogen per aryl group;
the halogen is bromine;
the hydroxyaryl sulfonic acid is para-hydroxyphenyl sulfonic acid, the dihydroxydiaryl sulfone is dihydroxydiphenyl sulfone and the aldehyde is formaldehyde; and
the halogenation is conducted by contacting an aqueous solution of the dihydroxydiaryl sulfone with a solution of halogen in methanol, and then neutralizing with alkali the reaction mixture containing the resulting halogenated aryl-group containing product.

29. A process according to claim 28 wherein the neutralized reaction mixture is mixed with water and the pH thereof adjusted to about 4 or less with a water-soluble acid.

30. A process according to claim 29 wherein the pH-adjusted aqueous reaction mixture is contacted with hydrogen peroxide to reduce the color of the mixture.

31. A process for forming a light stabile composition for imparting stain resistance to polyamide fiber-containing articles, comprising halogenating a hydroxyaryl sulfonic acid and a dihydroxydiaryl sulfone, and polymerizing the halogenated hydroxyaryl sulfonic acid and halogenated dihydroxydiaryl sulfone with an aldehyde.

32. A process according to claim 31 wherein the mixture of hydroxyaryl sulfonic acid and dihydroxydiaryl sulfone is halogenated with an average of about 0.16 to about 0.67 atomic equivalent of halogen per aryl group.

33. A process according to claim 31 wherein the mixture of hydroxyaryl sulfonic acid and dihydroxydiaryl sulfone is halogenated with bromine.

34. A process according to claim 31 wherein the hydroxyaryl sulfonic acid is para-hydroxyphenyl sulfonic acid, the dihydroxydiaryl sulfone is dihydroxydiphenyl sulfone, and the aldehyde is formaldehyde.

35. A process according to claim 31 wherein the halogenation is conducted in a reaction mixture formed by contacting an aqueous solution of the hydroxylaryl sulfonic acid and dihydroxydiaryl sulfone with a solution of halogen in a hydroxylic organic solvent, and then neutralizing the resulting halogenated aryl-group containing product.

36. A process according to claim 31 wherein:
the mixture of hydroxyaryl sulfonic acid and dihydroxydiaryl sulfone is halogenated with an average of about 0.16 to about 0.67 atomic equivalent of halogen per aryl group;
the halogen is bromide;
the hydroxyaryl sulfonic acid is para-hydroxyphenyl sulfonic acid, the dihydroxydiaryl sulfone is dihydroxydiphenyl sulfone and the aldehyde is formaldehyde; and
the halogenation is conducted by contacting an aqueous solution of the mixture of hydroxyaryl sulfonic acid and dihydroxydiaryl sulfone with a solution of halogen in methanol, and then neutralizing with alkali the reaction mixture containing the resulting halogenated aryl-group containing product.

37. A process according to claim 36 wherein the neutralized reaction mixture is mixed with water and the pH thereof adjusted to about 4 or less with a water-soluble acid.

38. A process according to claim 37 wherein the pH-adjusted aqueous reaction mixture is contacted with hydrogen peroxide to reduce the color of the mixture.

39. A polyamide fiber-containing textile article whose polyamide fibers have been rendered stain resistant by contacting the fibers with a light stabile composition comprising a halogenated aryl group-containing product of the condensation polymerization of a hydroxyaryl sulfonic acid, a dihydroxydiaryl sulfone, and an aldehyde.

40. A textile article according to claim 39 wherein the halogenated condensation polymerization product contains an average of about 0.16 to about 0.67 atomic equivalent of halogen per aryl group.

41. A textile article according to claim 39 wherein the halogen is bromine.

42. A textile article according to claim 39 wherein the hydroxyaryl sulfonic acid is para-hydroxyphenyl sulfonic acid, the dihydroxydiaryl sulfone is dihydroxydiphenyl sulfone and the aldehyde is formaldehyde.

43. A textile article according to claim 39 wherein the halogenated condensation polymerization product contains an average of about 0.16 to about 0.67 atomic equivalent of halogen per aryl group; the halogen is bromine; and the hydroxyaryl sulfonic acid is para-hydroxyphenyl sulfonic acid, the dihydroxydiaryl sulfone is dihydroxydiphenyl sulfone, and the aldehyde is formaldehyde.

44. A process of imparting stain resistance to a polyamide fiber-containing textile article, comprising contacting the polyamide fibers with a composition comprising a halogenated aryl group-containing product of the condensation polymerization of a hydroxyaryl sulfonic acid, a dihydroxydiaryl sulfone, and an aldehyde.

45. A process according to claim 44 wherein the halogenated condensation polymerization product contains about 0.16 to about 0.67 atomic equivalent of halogen per aryl group.

46. A process according to claim 44 wherein the halogen is bromine.

47. A process according to claim 44 wherein the hydroxyaryl sulfonic acid is para-hydroxyphenyl sulfonic acid, the dihydroxydiaryl sulfone is dihydroxydiphenyl sulfone, and the aldehyde is formaldehyde.

48. A process according to claim 44 wherein
the halogenated condensation polymerization product contains an average of about 0.16 to about 0.67 atomic equivalent of halogen per aryl group;
the halogen is bromine; and
the hydroxyaryl sulfonic acid is para-hydroxyphenyl sulfonic acid, the dihydroxydiaryl sulfone is dihydroxydiphenyl sulfone, and the aldehyde is formaldehyde.

49. A process according to claim 47 wherein the composition is used in admixture with water at a pH of about 4 or less.

50. The process of claim 44 wherein said composition contains halogenated product in an amount of about 0.1 to 2% by weight of the total weight of the fiber.

* * * * *